A. H. NEULAND.
DYNAMO ELECTRIC MACHINE.
APPLICATION FILED JUNE 17, 1914.
1,237,682.
Patented Aug. 21, 1917.
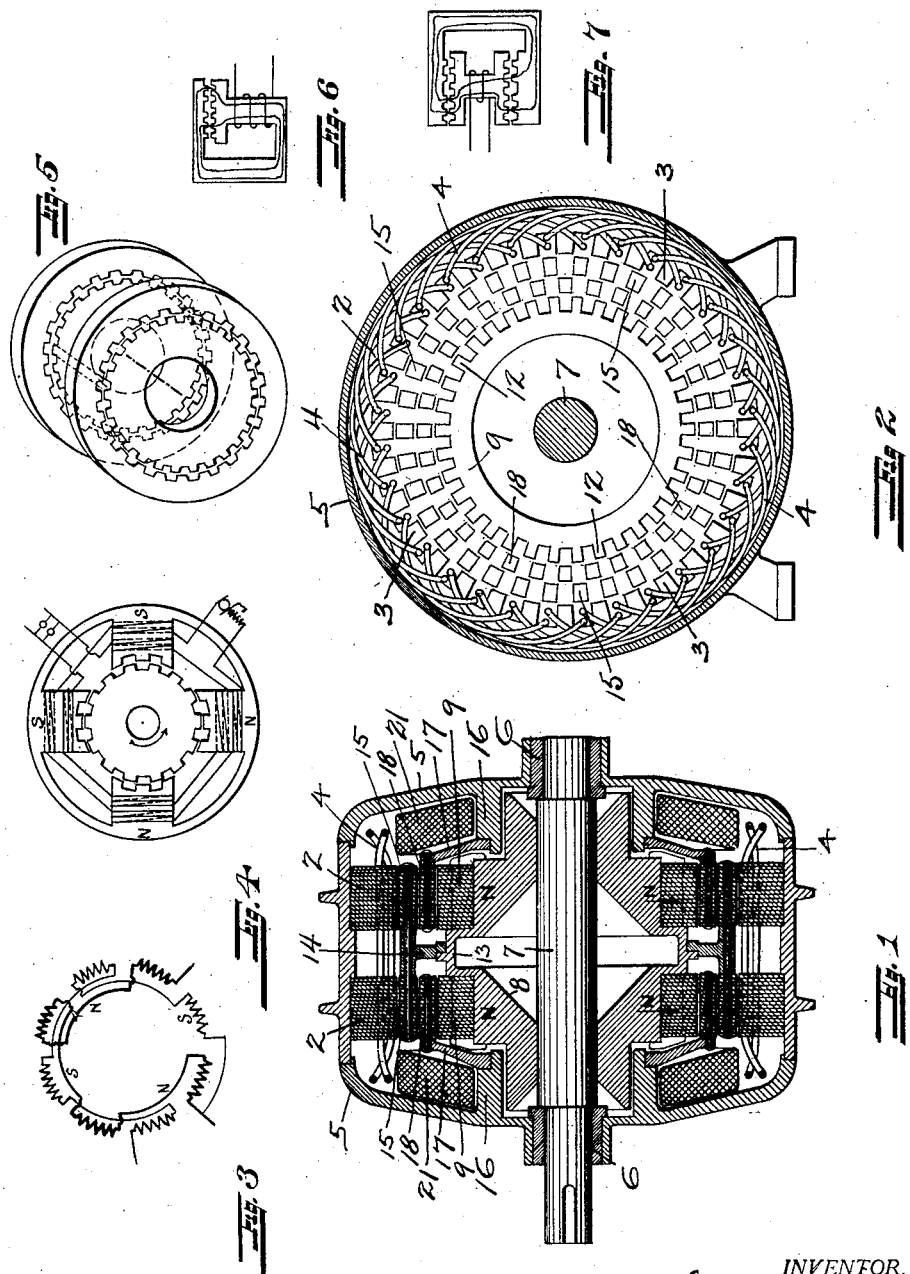
WITNESSES:
INVENTOR.
Alfons H. Neuland
BY Miller & White
his ATTORNEYS.

UNITED STATES PATENT OFFICE.

ALFONS H. NEULAND, OF SAN FRANCISCO, CALIFORNIA, ASSIGNOR TO NEULAND ELECTRICAL COMPANY, OF SAN FRANCISCO, CALIFORNIA, A CORPORATION OF NEW YORK.

DYNAMO-ELECTRIC MACHINE.

1,237,682.      Specification of Letters Patent.      Patented Aug. 21, 1917.

Application filed June 17, 1914. Serial No. 845,622.

*To all whom it may concern:*

Be it known that I, ALFONS H. NEULAND, a subject of the Czar of Russia, and a resident of the city and county of San Francisco, State of California, have invented certain new and useful Improvements in Dynamo-Electric Machines, of which the following is a specification.

The invention relates to dynamo electric machines and more particularly to generators and motors of the inductor type, which operate to generate or consume, per revolution, alternating current of high frequency.

One of the objects of the invention is to provide means for substantially decreasing the reaction due to the opposed magnetic flux of high frequency per revolution inductor alternators, thereby materially improving their regulation.

Another object of the invention is to increase the maximum possible output of such inductor alternators as well as to increase their efficiency.

The invention possesses other advantageous features, some of which, with the foregoing, will be set forth at length in the following description, where I shall outline in full that form of the invention which I have selected for illustration in the drawings accompanying and forming part of the present specification. In the drawings I have shown only one specific form of my generic invention, but it is to be understood that I do not limit myself to such form because my invention may be embodied in a multiplicity of forms, each being a species of my said invention. It is also understood that by the claims succeeding the description of my invention, I desire to cover the invention in whatever form it may be embodied.

In order that the present invention may be fully described and understood, I believe it advisable that extended reference be made herein to prior inductor alternators invented by me and that comparisons be drawn between these prior alternators and the alternator of the present invention. Two types of inductor alternators heretofore invented by me are fully described in my United States Letters Patent No. 1,160,087 issued on November 9, 1915 and in my United States Patent Number 1,211,617, dated January 9, 1917. I have also shown in the present drawings graphic or diagrammatic representations of these former alternators in order that the comparison may be more readily made and understood.

The type of alternator as has been heretofore constructed and as has been described in the said patents consists generally either of an externally toothed inductor surrounded by toothed pole-pieces carrying magnetizing and induced coils (as in United States Patent No. 1,160,087) or of two longitudinally spaced toothed inductors each surrounded by a toothed stator carrying induction windings, the two stators as well as the two inductors being magnetically connected and the magnetizing coil surrounding the inductor and separating the two parts thereof (as in application Serial Number 786,907).

Upon investigation of the magnetic circuit of the type shown in the first patent, it will be found that the number of lines of force or flux through the alined teeth, with the alternator excited and on open circuit, is determined by the resistance of the magnetic circuit, consisting of the stator path, the inductor path and principally the two air gaps in series, separating the alined stator and inductor teeth. This flux will hereinafter be termed the active flux. The number of lines of force or flux through the parts or pole-pieces of the machine, the teeth of which are staggered with respect to those on the inductor, is determined by the resistance of the stator and inductor paths and principally by the resistance of the two air gaps in series, one being the air gap at the alined teeth or projections and the other being the gap between the staggered teeth or projections. This flux will hereinafter be termed the opposing flux, since it subtracts from the generated voltage in the induction winding by reason of its passage through the induction winding in opposition to the active flux. The resultant flux, which generates a potential in the induction winding and which flux is obtained by subtracting the opposing flux from the active flux, will be hereinafter termed the effective flux.

Substantially the same conditions prevail in the type of inductor alternator described in the second patent, namely, a large opposed flux for a given excitation, since the resistance of the non-alined path includes the resistance due to the air gap separating the staggered teeth or projections and the resistance due to the air gap separating the alined projections, the latter being comparatively small while the resistance of the path of the active flux is composed principally of two air gaps in series, these air gaps being those which separate the alined projections. Since the flux through the paths is determined by the resistances of the paths and the relative resistances of the active and opposed flux paths (ignoring the resistance of the iron) are as the resistance of two active air gaps as compared to the resistances of one active and one opposed air gap, the difference between the two fluxes is comparatively small.

Under load conditions this relation is further exaggerated and the opposing flux is abnormally increased resulting in a considerable drop of the generated potential difference even when only a slight load current is circulating in the induced windings. This large drop in the potential difference is due to the following reason. Assuming constant excitation, the back ampere turns of the induced winding will reduce the M. M. F. effective to set up a flux through the path of the active flux. The ampere turns of the induced winding reduce the effective ampere turns available in the path of the active flux to set up a flux and increase the effective ampere turns in the path of the opposed flux. Where there are two alined parts in series, constituting the path of least resistance for the magnetic flux through the active windings, there is one non-alined part and one alined part in series, constituting the path of least resistance for the magnetic flux through the opposed windings. The combined field and load ampere turns, creating the opposed flux, now greatly exceed the combined field and load ampere turns creating the active flux. In spite of the greater air gap between the non-alined projections, the flux therethrough, in most machines of this type, equals the flux through the alined projections, resulting in zero potential difference, long before the induction ampere turns reaches 25% of the field ampere turns.

In the inductor generator of the present invention, I employ specially arranged magnetic circuits to bring about a greatly decreased opposed magnetic flux reaction under conditions of load, thereby bringing the regulation of this type of inductor alternator up to commercial requirements as well as substantially increasing the maximum possible generated current, which means a considerably increased output of the machine. This is accomplished in part by providing a magnetic circuit having a resistance at any point not greater than that of one non-alined portion and having a resistance at another point not greater than that of one alined portion.

In the accompanying drawings:

Figure 1 is a longitudinal section of the alternator of my invention.

Fig. 2 is a cross section partly diagrammatic of the alternator of my invention.

Fig. 3 is a diagrammatic representation of the induced windings on the alternator, showing a two-phase winding.

Fig. 4 is a diagrammatic representation of the alternator described in my Patent No. 1,160,287.

Fig. 5 is a diagrammatic representation in perspective of the alternator shown in Fig. 7 of my Patent No. 1,211,617.

Fig. 6 is a diagrammatic representation of the magnetic circuit of the alternator of the present invention.

Fig. 7 is a diagrammatic representation of the magnetic circuits of the alternators disclosed in my aforesaid patents.

The alternator of my invention may be employed either as a motor or a generator, but for the purposes of description herein, I shall describe its operation as a generator. The alternator may be wound for any desired number of phases, a two phase winding being illustrated in the drawings. In the drawings I have shown an alternator having two stators, two inductors and two field windings, and such double construction is for the purpose of balancing the machine mechanically, but it is to be understood that the double construction is not essential to the operation of the alternator, and that it may be constructed with one stator, one inductor and one magnetizing winding. In the following description I shall refer to the parts singly, it being understood that such description applies equally to the double or plural construction.

The alternator consists of a laminated steel stator 2, provided on its inner face with a plurality of regularly spaced teeth or projections 3, in the present construction there being thirty-two teeth or projections. Embedded in the spaces between the teeth and properly arranged on the stator are the coils 4 of the distributed induction winding. The stator is supported in a stationary steel housing 5 which is preferably provided with bearings 6 which are preferably formed of non-magnetic material, such as brass, in which the inductor shaft 7 is journaled. Mounted on the inductor shaft is a steel hub or core 8 upon which is arranged the laminated inductor 9. The inductor is provided on its periphery with a plurality of regularly spaced teeth or projections 12, in the present instance there being thirty-four such teeth. The number of teeth on the inductor differs from the number on the stator, the difference in the number of teeth determining the number of pairs of poles. The hub 8 is provided with a portion 13 extending beyond the base of the laminations thereon, and to this portion is secured a spider 14, to which is secured by means of suitable bolts or otherwise, a plurality of laminated bars 15. These bars are disposed longitudinally of the alternator, are equal in number to the teeth 12 on the inductor and are radially alined with and spaced from said teeth and rotate with the inductor. The periphery of the circle through the outer face of the bars 15 lies adjacent to the periphery of the circle through the inner face of the teeth 3 on the stator.

The housing 5 on which the stator is supported is provided with an inwardly extending cylindrical portion 16 encircling the outer portion of the hub and preferably spaced apart therefrom to provide an air gap between the housing and the hub. Secured to the inner end of the cylindrical portion 16 is a spider 17 of non-magnetic material such as brass to which are secured a plurality of laminated bars 18, which bars are parallel to the other bars and teeth, are equal in number and radially alined with the teeth 3 on the stator and are disposed between the teeth 12 on the inductor and the bars 15. There is thereby produced between the stator and the inductor, a multiple air gap, which I shall refer to as an air gap. On account of the difference in numbers of the teeth on the stator and inductor, the teeth and bars are alined at a given time, at one portion of the alternator and are staggered at another portion, and in the present instance, the teeth and bars are alined at two diametrically opposite portions and are staggered at two diametrically opposite portions, the alined and staggered portions being spaced apart 90° from each other. The air gap at the alined teeth and bars I have termed the alined air gap, and the air gap at the staggered teeth and bars I have termed the non-alined air gap. The various stationary and movable teeth produce, in the operation of the machine, a plurality of series of consecutive open and closed magnetic flux paths which form as many poles and traverse as many induction windings as there are open and closed portions, each closed portion being composed of all consecutive closed paths, and each open portion being composed of all consecutive open paths.

The function and purpose of the multiple air gap is fully disclosed in my Patent No. 1,211,617 as is also the arrangement of the induction winding and requires no further description in this specification. As described in said application, the induction winding at the non-alined portion is in opposition to the induction winding at the alined portion. The generated current in the induction winding at the alined portion is in opposition to the field current and the generated current in the windings at the non-alined portion is in the same direction as the field current.

Arranged on the cylindrical projection 16 is the magnetizing winding 21. The magnetic circuit includes the housing, the cylindrical projection 16, the hub 8, the inductor, alined and non-alined air-gaps, the stator and the air gap between the cylindrical projection and the hub, which last named air gap is in series with both the alined and non-alined portions of the machine, and which is of substantially unvarying resistance irrespective of the rotative position of the inductor or the current in the induction windings.

It will be seen from this construction that there is only one alined portion of the machine inserted in series in the path of the magneto-motive force or flux and also that there is only one induction coil or winding in series therewith and also that there is only one non-alined portion in series and in the path of the magnetic flux. The alined and non-alined portions are in parallel in the magnetic circuit. In the machine of my invention, with the field coil excited and the induction windings on open circuit, the active flux through the alined teeth is principally determined by the single air gap separating the teeth, while the opposed flux through the non-alined teeth is determined by the single air gap separating them. The magnetic circuit of the present machine is clearly indicated in Fig. 6, wherein it is shown that the circuit includes only one alined gap in series and one non-alined gap in series and it is evident that the flux through the two portions of the circuit is determined by the resistances of the gaps. In this form of circuit, there are but two available paths for the flux, one through the alined portion, and one through the non-alined portion. The magnetic circuit of the type of machine shown in my Patent No. 1,211,617 is shown, for the purposes of comparison, in Fig. 7, wherein it appears that the magnetic circuit includes two alined gaps in series and two non-alined gaps in series. In this form of circuit, there are four available paths for the flux, one through the two alined portions, one through one alined and one non-alined portion, one through the other alined and non-alined portions, and one through the two non-alined portions.

The insertion of the air gap between the cylindrical projection 16 and the hub 8 in the magnetic circuit, in series with both the alined and non-alined portions of the machine, still further decreases the reaction as well as the potential drop at load, since it enables the employment of a considerable increase in the field ampere turns without materially increasing the magnetic density. The added gap serves to lower the potential difference on open circuit, and to cause a smaller drop of potential for a given load. The fixed air gap in the magnetic circuit can be accomplished in other ways than that shown. For instance the inductor or stator may be formed with a smooth instead of a toothed periphery, and the teeth may be in the shape of bars, spaced apart from the stator or inductor, so that an air gap is present, or between a row of bars fixed to the stator and the inductor teeth, may be disposed a row of bars fixed to and spaced from the inductor.

I claim:

1. In a dynamo electric machine of the inductor type, means for producing a magnetic flux, a stator having spaced teeth and an inductor having spaced teeth forming a magnetic circuit, said teeth forming a plurality of series of consecutive closed and open magnetic flux paths, which flux forms in effect the same number of poles and traverses the same number of induction windings as there are series of closed paths and series of open paths, said induction windings, the magnetic circuit including only one of said flux paths in series.

2. In a dynamo electric machine of the inductor type, means for producing a magnetic flux, a stator having spaced teeth and induction windings embedded between said teeth, an inductor having spaced teeth arranged in operative relation with said stator, said stator and inductor forming a magnetic circuit, said teeth being arranged so that they form a plurality of series of consecutive closed and open magnetic flux paths which flux forms in effect as many poles and traverses as many induction windings as there are series of closed paths and series of open paths, the magnetic circuit including only one of said flux paths in series.

3. In a dynamo electric machine of the inductor type, means for producing a magnetic flux, an induction winding, a stator having spaced teeth between which the winding is embedded, an inductor having spaced teeth arranged in operative relation with said stator, said stator and inductor forming the magnetic circuit, the numbers of teeth on the stator and inductor being different whereby the teeth are alined at a plurality of portions and non-alined at a plurality of intermediate portions, thereby providing a plurality of series of consecutive closed and open magnetic flux paths, which flux forms in effect as many poles and traverses as many induction windings as there are closed and open portions, the magnetic circuit of two adjacent poles including a single alined portion and a single non-alined portion, said portions being in multiple with relation to each other.

4. In a dynamo electric machine of the inductor type, means for producing a magnetic flux, a stator having spaced teeth and an inductor having spaced teeth forming the magnetic circuit, said teeth forming a plurality of series of consecutive closed and open magnetic flux paths which form in effect the same number of poles and traverse the same number of induction windings as there are series of closed paths and series of open paths, said induction windings, the magnetic circuit including a constant resistance gap, and a single variable resistance gap in series.

5. In a dynamo electric machine of the inductor type, means for producing a magnetic flux, a stator having a plurality of bars spaced apart magnetically from the body of the stator, an inductor having a different number of bars spaced apart magnetically from the body of the inductor and lying between the body and the bars of the stator, the bars forming a plurality of series of closed and open magnetic flux paths, which flux forms in effect as many poles as there are series of open paths and series of closed paths, said stator and inductor forming a magnetic circuit which includes one only of said portions in series.

6. In a dynamo electric machine of the inductor type, a stator having a plurality of bars spaced apart radially from the body of the stator, an inductor having a different number of bars spaced apart radially from the body of the inductor and lying between the body and the bars of the stator, the number of bars on the two elements being such that they form a plurality of series of consecutive closed and open flux paths, said stator and inductor forming a magnetic circuit, which circuit includes a constant resistance gap and a single variable resistance gap in series.

7. In a dynamo electric machine of the inductor type, means for producing a magnetic flux, a stator having a plurality of teeth thereon and an equal number of bars spaced radially from the teeth and alined therewith, an inductor having a different number of teeth thereon and an equal number of bars spaced radially from said teeth, said stator and inductor forming a magnetic circuit, the numbers of teeth and bars being such that they form a plurality of series of consecutive closed and open magnetic flux paths, which flux forms in effect as many poles and traverses as many induction windings as there are series of closed paths and series of open paths and said induction windings.

8. In a dynamo electric machine of the inductor type, means for producing a magnetic flux, a stator having a plurality of teeth thereon and an equal number of bars spaced radially from the teeth and alined therewith, an inductor having a different number of teeth thereon, and an equal number of bars spaced radially from said teeth, said stator and inductor forming a magnetic circuit, the numbers of teeth and bars being such that they form a plurality of series of consecutive closed and open magnetic flux paths, which flux forms in effect as many poles and traverses as many induction windings as there are series of closed paths and series of open paths, the magnetic circuit including a plurality of series of closed paths and series of open paths in multiple, and said induction windings.

9. In a dynamo electric machine of the inductor type, a plurality of induction windings, a stator having a plurality of teeth on its inner periphery, the induction winding being disposed between said teeth, a housing surrounding said stator, a shaft arranged in said housing, an inward projection on said housing surrounding said shaft, a magnetizing winding surrounding said projection, and an inductor having a different number of teeth on its outer periphery, the numbers of the teeth on the stator and inductor being different whereby the teeth are alined at a plurality of portions and non-alined at a plurality of intermediate portions, thereby providing a plurality of series of consecutive closed and open paths for the magnetic flux, which flux forms in effect the same number of poles and traverses the same number of induction windings as there are series of closed and open flux paths.

In testimony whereof, I have hereunto set my hand at San Francisco, California, this 12th day of June, 1914.

ALFONS H. NEULAND.

In presence of—
H. G. PROST,
P. S. PIDWELL.